United States Patent
Dietterle et al.

(10) Patent No.: US 8,654,764 B2
(45) Date of Patent: Feb. 18, 2014

(54) PROTOCOL ACCELERATOR MODULE WITH PACKET FORWARDING FUNCTION AND A METHOD OF TRANSCEIVER OPERATION FOR RAPID FORWARDING OF DATA PACKETS

(75) Inventors: Daniel Dietterle, Frankfurt (DE); Peter Langendörfer, Frankfurt (DE)

(73) Assignee: IHP GmbH—Innovations for High Performance Microelectronics/Leibniz—Institut für innovative Mikroelektronik, Frankfurt (DE)

(*) Notice: Subject to any disclaimer, the term of this patent is extended or adjusted under 35 U.S.C. 154(b) by 0 days.

(21) Appl. No.: 12/737,274

(22) PCT Filed: Mar. 16, 2010

(86) PCT No.: PCT/EP2010/053388
§ 371 (c)(1),
(2), (4) Date: Apr. 11, 2011

(87) PCT Pub. No.: WO2010/108825
PCT Pub. Date: Sep. 30, 2010

(65) Prior Publication Data
US 2012/0002669 A1    Jan. 5, 2012

(30) Foreign Application Priority Data
Mar. 24, 2009 (DE) .......................... 10 2009 001 821

(51) Int. Cl.
H04L 12/56    (2011.01)
(52) U.S. Cl.
USPC .................. 370/389; 370/395.3; 370/395.31; 370/376; 370/395.7
(58) Field of Classification Search
USPC .............. 370/389, 395.3, 395.31, 395.7, 376
See application file for complete search history.

(56) References Cited

U.S. PATENT DOCUMENTS 5,566,170 A * 10/1996 Bakke et al. .................. 370/392
5,751,715 A   5/1998 Chan et al. .................... 370/455

(Continued)

FOREIGN PATENT DOCUMENTS

DE    19648073    6/1998
DE    102005021849    11/2006

(Continued)

OTHER PUBLICATIONS

Daniel Diettrle, A hardware accelerated implementation of the IEEE 802.15.3 MAC protocol, 2009.*

(Continued)

*Primary Examiner* — Man Phan
*Assistant Examiner* — Mewale Ambaye
(74) *Attorney, Agent, or Firm* — Ware, Fressola, Maguire & Barber LLP (57) ABSTRACT

The present invention relates to a protocol accelerator module for a data transmission protocol level of a transceiver, particularly but not exclusively for rapid forwarding of data packets in wireless sensor networks using the time-division multiple access method according to the IEEE 802.15.4 standard. The invention also relates to a method of transceiver operation for rapid forwarding of data packets, likewise particularly, but not exclusively, in wireless sensor networks using the time-division multiple access method according to the IEEE 802.15.4 standard. The core of the invention is a reference table which stores references from identifiers of second transceivers to identifiers of third transceivers as well as references from specific messages to identifiers of third transceivers. A transceiver can check during reception of a data packet whether it is a data packet to be forwarded, and can take appropriate precautions for rapid sending of a data packet to be forwarded. This allows real-time conditions of many applications to be met.

11 Claims, 2 Drawing Sheets

(56) References Cited

U.S. PATENT DOCUMENTS

| | | | |
|---|---|---|---|
| 2006/0215710 A1* | 9/2006 | Odashima et al. | 370/535 |
| 2007/0011727 A1 | 1/2007 | Mielenz et al. | 726/6 |
| 2007/0159994 A1* | 7/2007 | Brown et al. | 370/324 |
| 2008/0291855 A1 | 11/2008 | Bata et al. | 370/311 |
| 2009/0135836 A1* | 5/2009 | Veillette | 370/400 |
| 2010/0085966 A1* | 4/2010 | Samuels et al. | 370/389 |
| 2011/0216713 A1* | 9/2011 | Kim et al. | 370/329 |

FOREIGN PATENT DOCUMENTS

| | | | |
|---|---|---|---|
| DE | 102007003634 | | 4/2008 |
| WO | WO 99/04343 | * | 1/1999 |

OTHER PUBLICATIONS

European Patent Office; A. Mircescu; "International Search Report"; whole document; Jun. 11, 2010; Rijswijk, Netherlands.

Nordic Semiconductor; "nRF2401A Transceiver—The Nordic Semiconductor nRF2401A ultralow power 2/4GHz transceiver"; 2 pages; downloaded from the Internet Dec. 8, 2010 from http://www.Nodicsemi.com.

IEEE, 10$^{th}$ Asia-Pacific Conference on Communications and tth International Symposium on Multi-Dimensional Mobile Communications; X. Ningyi et al.; "Protocol Accelerator design for IEEE 802.15.3 MAC Implementation"; pp. 189-192; 2004.

IEEE Computer Society; "IEEE Std 802.15.4—Part 15.4: Wireless Medium Access Control (MAC) and Physical Layer (PHY) Specifications for Low-Rate Wireless Personal Area Networks (WPANs); JN5139 Wireless Microcontroller (IEEE802.15.4 and JenNet)"; 1 page; Sep. 8, 2006; New York, NY, USA.

Springer Science + Business Media, LLC; D. Dietterle et al.; "A hardware accelerated implementation of the IEEE 802.15.3 MAC protocol"; 7 pages; Jan. 7, 2009.

Texas Instruments; "2.4 GHz IEEE 802.15.4 / ZigBee-ready RF Transceiver"; pp. 1-89; 2007.

* cited by examiner

PROTOCOL ACCELERATOR MODULE WITH PACKET FORWARDING FUNCTION AND A METHOD OF TRANSCEIVER OPERATION FOR RAPID FORWARDING OF DATA PACKETS

CROSS REFERENCE TO RELATED APPLICATIONS

This application is for entry into the U.S. national phase under §371 for International Application No. PCT/EP2010/053388 having an international filing date of Mar. 16, 2010, which claims priority to German Patent Application No. 102009001821.2 filed on Mar. 24, 2009.

BACKGROUND OF THE INVENTION

1. Technical Field

The present invention relates to a protocol accelerator module for a data transmission protocol level of a transceiver, particularly but not exclusively for rapid forwarding of data packets in wireless sensor networks using the time-division multiple access method according to the IEEE 802.15.4 standard.

The invention also relates to a method of transceiver operation for rapid forwarding of data packets, likewise particularly, but not exclusively, in wireless sensor networks using the time-division multiple access method according to the IEEE 802.15.4 standard.

2. Discussion of Related Art

The IEEE 802.15.4 standard defines protocols for the first layer, i.e., the bit transmission layer, and for parts of the second layer, i.e. the media access layer of the data backup layer, of the ISO/OSI (International Standardization Organisation/Open Systems Interconnection) reference model.

Said standard supports wireless communication in a wireless network in which the transceiver of the network sends and receives data packets at data rates of up to 250 kilobits per second (kbps). It is particularly aimed at achieving a very low-complexity network structure that permits the participant transceivers to operate under battery power for several months and possibly even for several years due to the minimal system requirements. The distances between the respective transceivers of a network according to this standard are usually some meters, such as 10 m. The standard is used, for example, in sensor networks that are deployed in production automation technology or in interactive toys.

The structure of a network conforming to the IEEE 802.15.4 standard shall now be described in greater detail. In order to implement the IEEE 802.15.4 standard (IEEE Standard 802, "Part 15.4: Wireless Medium Access Control (MAC) and Physical Layer (PHY) Specifications for Low-Rate Wireless Personal Area Networks," 2006), a specially configured transceiver is provided—a "coordinator", also referred to as a full function device (FFD) by those skilled in the art. A number of normally configured transceivers, referred to as reduced function devices (RFDs), are assigned to the coordinator.

The RFDs cannot communicate with each other directly, but only via the coordinator. The coordinator detects data packets that need to be forwarded and transmits these to the designated receiver or receivers. The coordinator may also comprise an interface to other data networks of whatever kind, for example to wireless networks such as Bluetooth or WLAN networks. In this connection it is also referred to as an "access point".

In order to prevent collisions due to simultaneous transmission of several data packets, a time-division multiple access method (TDMA) is used, which may similarly be organized by the coordinator. To this end, the coordinator transmits "beacon data blocks" to all its associated RFDs at regular intervals, from which the RFDs can learn in which time slots they may transmit data packets. Only one transceiver may transmit data packets in a given time slot. Time slots are also allocated to the coordinator itself, of the kind that permit the transmission of the coordinator's own data packets, and of the kind provided for transmitting data packets that need to be forwarded. The latter time slots likewise contain the information about which receiver RFD the time slots is intended for.

In this standard, a data packet comprises a packet header and a data payload section. The packet header contains a maximum of two addresses, namely the transmitter and the immediate destination. The data payload is generally a few bytes in size. In order to prevent collisions between data packets, the standard also specifies alternative ways of organizing the TDMA method, in addition to the transmission of beacon data blocks by the coordinator.

In the protocol, it is also specified that all data packets to be transmitted are provided with an error detection code. A "cyclic redundancy check" (CRC) algorithm is used for this purpose, which calculates a checksum of all the bytes and places it at the end of the data packet. The recipients of the data packet calculate the CRC checksum on the basis of the received bytes and compare the result with the accompanying calculated value and sent in the data packet by the transmitter. When both checksums are identical, there is a very high probability that the data packet was correctly transmitted, otherwise an error is detected and the data packet is rejected.

The transmission of information from a first RFD (for example a sensor) to a second RFD (for example an actuator) therefore requires two time slots. In a first time slot, a data packet is transmitted from the first RFD to the coordinator, and in a second time slot, which need not follow immediately, the data packet is transmitted from the coordinator to the second RFD.

In order to forward the data packets, the coordinator must decode them, place them in an intermediate memory or buffer and prepare them for transmission in the correct time slot. In present-day applications of the aforementioned standard, part of the media access protocol (as well as the digital and analog signal processing) is realized in hardware, namely the functions of checking the data packet for transmission errors and adding an error checksum to the data payload, possibly also the functions of filtering the data packet on the basis of the address data in the packet header and automatically sending acknowledgement packets to the transmitter. A received data packet is stored in a transmit buffer to which a microcontroller can gain access. A software routine checks, inter alia, whether the data packet is one that needs to be forwarded. If this is affirmed, the data packet is transferred from the receive buffer to a transmit buffer. The data packets of the transmit buffer are transmitted on a "first in, first out" (FIFO) basis. Processing by the software is very time-consuming and involves an interrupt delay.

Figure 1:
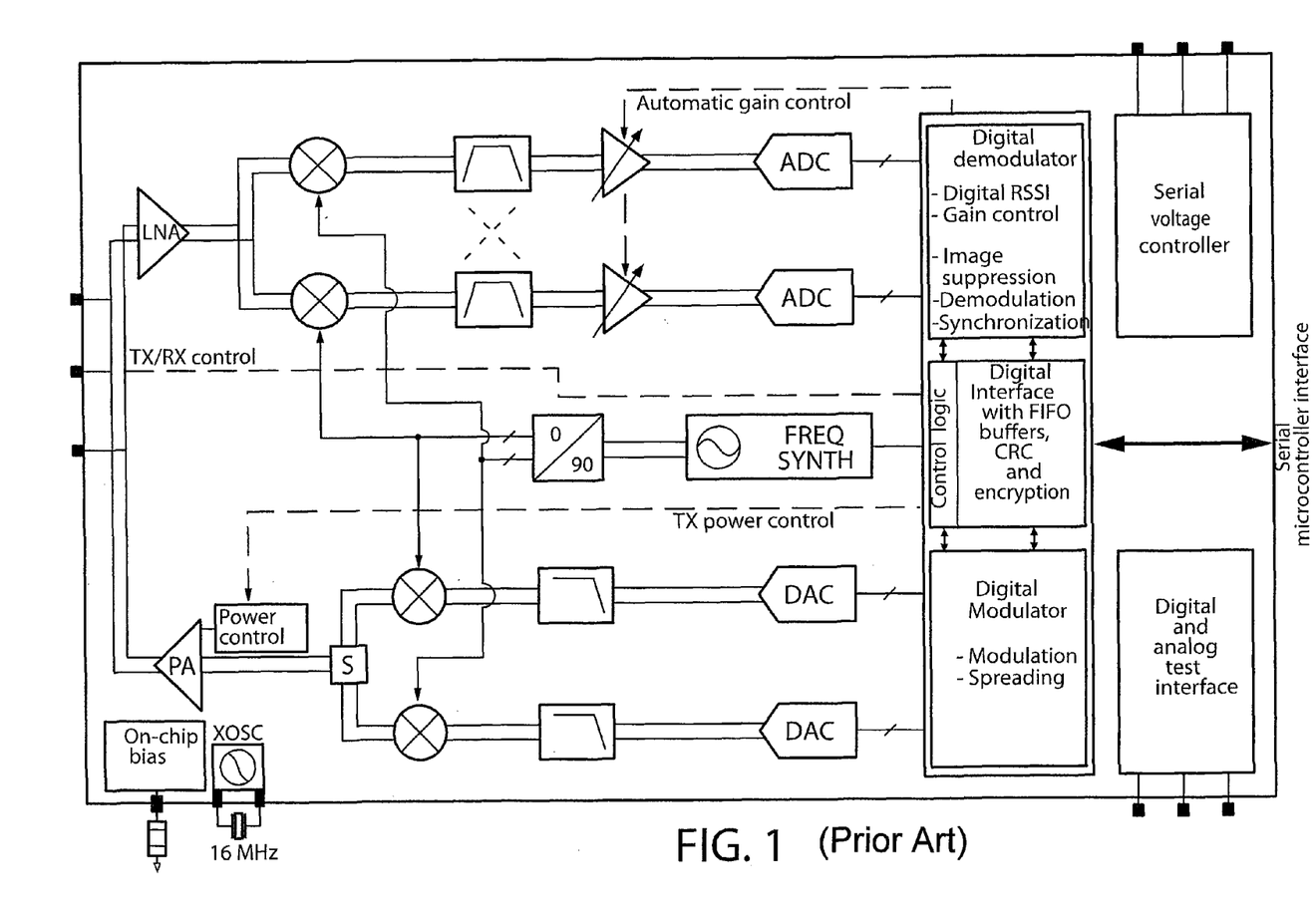
FIG. 1 a block diagram of a one-chip transceiver according to the prior art and FIG. 2 a block diagram of a transceiver with a protocol accelerator module according to the invention.

FIG. 1 shows a block diagram of the popular CC2420 single-chip transceiver made by TEXAS INSTRUMENTS and compliant with the IEEE 802.15.4 standard. It stands as an example for a number of other chips, such as the JN5139 made by JENNIC Ltd., the ML7065 made by OKI Semiconductor or the nRF2401A made by NORDIC Semiconductor, which provide the aforementioned hardware support for implementation of the media access protocol.

Whereas the signal propagation delay for the short distances between the RFDs is very short, and the data transmission times for data packets only a few bytes in size are also very short, the processing steps in the coordinator for forwarding data packets, in particular the steps that are implemented by software, are relatively time-consuming and stand in the way of a real-time connection between two or more RFDs. Transmission delays of many milliseconds can occasionally be expected. For many applications, this long transmission delay is not acceptable, since a rapid response to certain transmitted data packets may be desired. One can imagine, for example, a photoelectric barrier sensor (first RFD) and a stepper motor control (second RFD), in which the motor control must trigger a movement in response to signals from the photoelectric barrier sensor. In the context of this application, the expression "real-time connection" means that a system delivers a response to a stimulus within a defined period of time. This period may well amount to a number of minutes, depending on the system. For systems such as those mentioned above, for example in the field of production automation technology or interactive toys, the period is about a few milliseconds in duration.

The use of high-performance processors for shortening the interrupt delay caused by software is not a suitable approach due to the higher power consumption of the coordinator that this involves.

A protocol accelerator module for a data backup layer of transceiver is known from the German patent specification DE 10 2007 003 634 B3 filed by the present applicant, said module being configured, inter alia, to check that received data packets are received successfully and to trigger a memory operation in respect of said data packets, as well as to manage a queue of own data packets to be transmitted and to select data packets from the queue for transmission within an assigned transmission time slot and to transfer them to a transmitter unit.

Rapid forwarding of data cells is known from an asynchronous transfer mode (ATM) protocol for data transmission, a technology in which the forwarding function is performed by an ATM switch. In ATM switches, every incoming ATM data cell is guided from its input port to a predefined output port. On the output side, there is no need to pay attention to a suitable time slot or to the sender of the ATM data cells, since forwarding occurs on the basis of channel identifiers that are part of a given ATM data cell, and the assignment of channel identifiers to output ports is configured while a connection is established.

The disadvantage of prior art protocol accelerators is that they do not provide a function for accelerating data packet forwarding. The aforementioned protocol accelerators are therefore suitable to only a qualified extent for transceivers that adopt a coordinator role.

One object of the invention is therefore to propose a protocol accelerator module or a method of transceiver operation that permits rapid forwarding of data packets from second transceivers to third transceivers.

DISCLOSURE OF INVENTION

According to a first aspect of the invention, the technical problem is solved by a protocol accelerator module according to claim 1 and referred to in the following as an accelerator module. The accelerator module according to the invention is configured to query a reference table on receiving the data packet from the second transceiver during a first time slot, said reference table containing at least one reference from the following group of reference types:

a) a reference in a specific reception time slot to an identifier of at least one third transceiver, according to which a data packet received by the transceiver during the specific reception time slot is to be forwarded to the third transceiver;

b) a reference in an identifier of a specific second transceiver, as transmitter, to an identifier of at least one third transceiver as the predetermined receiver of the data packet, referred to in the following as a virtual connection; or c) a reference in a predetermined message contained in the data packet to an identifier of at least one third transceiver as the predetermined receiver of the data packet;

Finally, the accelerator module is configured to detect in the reference table an identifier of a third transceiver as the receiver of the data packet, when a reference matching the data packet is present, and during a second time slot immediately following the first time slot to cause the data packet to be sent to the third transceiver if the second time slot has been assigned to said transceiver.

In the context of this application, second transceivers refer to the subscribers in a sensor network that want to transmit the data packets to third transceivers. Third transceivers within the context of this application refer to the subscribers in a sensor network that receive the data packets from second transceivers. Given that both transmitters and receivers can be integrated in a single component, reference is commonly made to transceivers and not to "transmitters" and "receivers".

The invention is based on the idea that the disadvantage of prior art accelerator modules results in particular from all received data packets initially being written categorically into a memory on the receiver side of the transceiver, which a microcontroller or similar digital processing unit later accesses and determines whether the data packet needs to be forwarded or not. Thus, prior art accelerator modules are not configured to distinguish between data packets which need to be forwarded and data packets which do not need to be forwarded.

The advantage of the accelerator module according to the invention, in contrast, is that, on receiving the data packet during the first time slot, it decides by querying the reference table whether or not to forward the data packet. This means it is basically possible to retransmit the data packet as early as the next adjacent time slot.

The criteria according to which the accelerator module selects a data packet for forwarding and which is to be the actual receiver of the data packet can be configured on the basis of the reference types. One option is for all data packets received within a specific reception time slot to always be sent to a specific third transceiver (reference type a). In this case, the content of the data packet does not need to be analyzed, since knowledge of the reception time is sufficient. If the reception time is to be ignored, the accelerator module may decide on whether or not to forward by referring to the transmitter's address (reference type b), which is usually stored in a header of the data packet or on the basis of a predetermined message in the data payload part of the data packet (reference type c). The latter option has the advantage that the forwarding of data packets can also be realized according to the content of the data payload. A predetermined message may contain information from a second transceiver relating to a plurality of other third transceivers, for example the receiving of a special signal or value (e.g. "emergency off", "photoelectric barrier broken" or "motor standstill");

the receiving of a value above or below a threshold value or within a given interval; or the complex combination of one or more values (a values vector) received from the same or other sensors.

Administration of the reference table, in other words the configuration of the conditions for forwarding, may be carried out by a processor of the transceiver, for example.

In one embodiment of the TDMA-based data transmission protocol, the duration of a time slot is approximately 960 μs. This means that a real-time request lasting a few milliseconds, which may be submitted by a connection between the second transceiver and the third transceiver, can be fulfilled with this solution. The accelerator module according to the invention is therefore suitable, in particular, for a transceiver which provides the function of a coordinator in a wireless network.

Embodiments of the inventive accelerator module shall now be described. The additional features of the embodiments may be combined with each other to form new types of embodiment, unless they are described as alternatives to each other.

It is expedient if the accelerator module according to the invention is configured in one embodiment to detect a receiver identifier, contained in the received data packet, of at least one third transceiver when the data packet from the second transceiver is received during the first time slot, and to cause the data packet to be sent to the third transceiver during the second time slot if no corresponding reference type for the data packet is present in the reference table and the second time slot has been assigned to said transceiver.

This has the advantage that rapid forwarding is also possible for data packets for which no reference type is stored in the reference table. In this embodiment, the forwarding decision is made on the basis of the receiver identifier included in the data payload of the data packet.

In one embodiment, the accelerator module is implemented in hardware and comprises a data packet analyzer on the receiving side, which is configured to write the data payload of the received data packet into a data payload memory of the accelerator module and to write into an information memory the detected identifier of the third transceiver as receiver of the data packet, and a memory address of the stored data payload;

In this embodiment, the accelerator module also comprises a control unit on the transmitter side, which is configured to receive time slot information via a time slot assigned to the transceiver and to detect a receiver identifier of a third transceiver contained in the time slot information and to compare said identifier with detected receiver identifiers in the information memory.

The control unit is also configured to fetch the data payload stored in the data payload memory and associated with the matching receiver identifier on the basis of a memory address assigned to the matching receiver identifier, when the receiver identifier contained in the time slot information matches a receiver identifier in the information memory, and to trigger the generation of a packet header to be added to the fetched data payload.

Finally, the control unit is configured to provide the fetched data payload and the generated packet header to a transmitter unit of the transceiver as a data packet to be forwarded, for transmission in the assigned time slot.

For certain data packets, it may be sufficient for the accelerator module to make a forwarding decision knowing only the time of reception (reference type a), or to detect the transmitter identifier of the second transceiver from the packet header of the incoming data packets (reference type b).

In these cases, it is not necessary to analyze the data payload of the incoming data packet. If data packets from second transceivers or data packets received in a specific reception time slot are not to be automatically forwarded to predetermined third transceivers, the data packet analyzer either determines the receiver identifiers of third transceivers or predetermined messages from the data payload of the incoming data packet. The data packet analyzer transfers the data payload into the data payload memory and stores in the information memory the memory address of the data payload as well as the identifiers of third transceivers detected from the reference table or from the data payload of the data packet.

The control unit on the transmitter side receives time slot information informing it whether a transmission time slot is available for the transceiver and for which third transceiver said time slot is provided. The control unit checks whether the identifier provided in the transmission time slot for this third transceiver is also stored in the information memory. If this is the case, the control unit causes a packet header to be generated with the respective identifier and provides this header, as well as the data payload fetched with the memory address, for transmission to the third transceiver. Generation of the packet header involves setting address fields in such a way that the data packet to be forwarded is now targeted at the third transceiver determined as the receiver.

In the latter embodiment, the transceiver according to the invention advantageously comprises on the receiving side a decryption device which is configured to decrypt an incoming encrypted data packet from a second transceiver during the first time slot, and on the transmitter side an encryption device which is configured to encrypt, during the next time slot assigned to the transceiver, a data packet to be transmitted, in such a way that the accelerator module can also be used in wireless networks of the kind in which data packets are transmitted in encrypted form.

In one preferred embodiment of the accelerator module according to the invention, a respective level of priority is assigned to a respective reference type and the accelerator module is configured to cause the data packet corresponding to the reference type of highest priority to be sent to the third transceiver when a plurality of references of different reference types matching the received data packet are simultaneously present.

The assignment of priorities makes it easier to organize the forwarding of data packets. When a plurality of correct references for a received data packet are simultaneously present, it is possible to select a reference type on the basis of the priority level and, on the basis of said reference type, to detect in the reference table the identifier of the third transceiver as the receiver of the data packet. However, it is also conceivable that the accelerator module causes the data packet to be forwarded in accordance with all the matching references.

In another preferred embodiment, the accelerator module according to the invention is configured to assign a respective maximum retention time to specific virtual connections in the reference table and to transmit received data packets which need to be forwarded according to a specific virtual connection, with prioritization according to a respective remaining retention time.

It is possible, of course, for virtual connections to be established from several second transceivers, as transmitters, to a single third transceiver as receiver, and for these connections to be stored in the reference table. This may result in data packet congestion if the channel capacity during a transmission time slot is not sufficient. One way of organizing the transmission of a plurality of data packets destined for a single third transceiver is to assign retention times for specific virtual connections. The data packets with the smallest remaining retention time are then transmitted first. Data packets that could not be transmitted within their respective retention time may be discarded, for example.

The accelerator module is particularly suitable for performing data transmission protocol tasks in compliance with the IEEE 802.15.4 standard.

According to a second aspect of the invention, a transceiver with an accelerator module according to the first aspect of the invention or one of the embodiments described herein is proposed. The transceiver according to the second aspect of the invention shares the advantages of the accelerator module according to the first aspect of the invention.

The transceiver according to the invention is preferably configured: to write a data packet destined for the transceiver into a buffer on the receiver side of the transceiver; to manage a queue of data packets to be sent in a buffer on the transmitter side of the transceiver, and to select data packets from the queue during a time slot assigned to the transceiver and to cause said data packets to be sent to one or more third transceivers.

This has the advantage that the transceiver does not just provide a function for the forwarding of data packets, but can itself participate in a wireless network, for example as a sensor or actuator.

According to a third aspect of the invention, a sensor node with a sensor, and a transceiver according to the second aspect of the invention or according to one of the embodiments described herein and connected to said sensor node is proposed. The sensor node of the third aspect of the invention shares the advantages of the transceiver according to the second aspect of the invention.

With regard to its method aspect, the invention provides a method of transceiver operation, comprising the forwarding of a data packet from a second transceiver to one or more third transceivers according to a TDMA-based data transmission protocol, said forwarding comprising the following steps:

receiving the data packet from the second transceiver during a first time slot;

querying a reference table, said reference table containing at least one reference from the following group of reference types:

a) a reference in a specific reception time slot to an identifier of at least one third transceiver, according to which a data packet received by the transceiver during the specific reception time slot is to be forwarded to the third transceiver;

b) a reference in an identifier of a specific second transceiver, as transmitter, to an identifier of at least one third transceiver as the predetermined receiver of the data packet, referred to in the following as a virtual connection; or c) a reference in a predetermined message contained in the data packet to an identifier of at least one third transceiver as the predetermined receiver of the data packet;

detecting in the reference table an identifier of a third transceiver as the receiver of the data packet, if a matching reference for the data packet is present, or detecting an identifier of a third transceiver in the data payload of the received data packet, if no reference matching the data packet is present; and sending the data packet to the third transceiver during a second time slot immediately following the first time slot, if the second time slot has been assigned to the transceiver.

The method of operation is suitable in particular for performing tasks of a data backup protocol level according to the IEEE 802.15.4 standard in a transceiver.

The method of operation according to the invention shares the advantages of the accelerator module according to the first aspect of the invention and of the embodiments described herein.

BRIEF DESCRIPTION OF THE DRAWINGS

Other advantages of the invention shall now be explained in the following description of an embodiment, with reference to the Figures, which show in schematic view.

DETAILED DESCRIPTION

Figure 2:
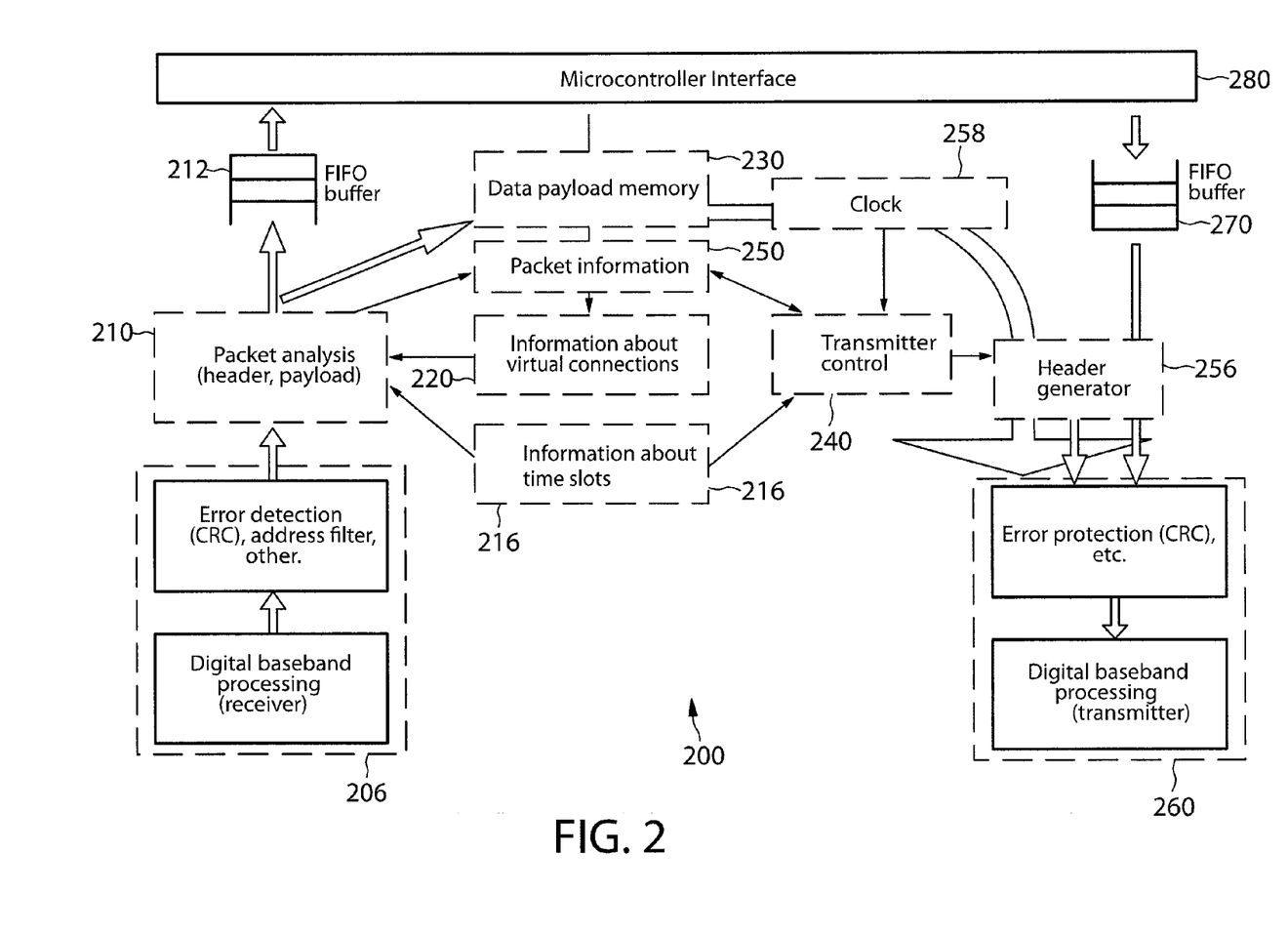

The accelerator module according to the invention is embedded between a receiver path and a transmitter path of a transceiver 200. On the input side, transceiver 200 has a receiver unit 206 which accepts the incoming data packets from second transceivers, filters them according to address, calculates a CRC checksum in respect of the data packets addressed to the transceiver and feeds these data packets to data packet analyzer 210.

Data packet analyzer 210 determines whether the data packet is a data packet which needs to be forwarded to a third transceiver or whether it is a data packet intended for the transceiver. To this end, data packet analyzer 210 receives time slot information 216 and queries a reference table 220 for currently established virtual connections. The virtual connections may be references from identifiers of second transceivers, for example, or from predetermined messages or from time slots to identifiers of third transceivers.

The criteria according to which a data packet is selected for forwarding and the actual receiver of the data packet is specified can be configured. One option is for all data packets received within a specific reception time slot to always be sent to one or more predetermined third transceivers. In this case, the content of the data packet does not need to be taken into consideration, since knowledge of the reception time is sufficient. If the reception time is to remain ignored, it is possible for the forwarding decision to be made on the basis of the sender's address, or a predetermined message in the data payload of the data packet (e.g. receiving a special signal such as an "emergency off" signal) or on the basis of the identifiers of third transceivers included in the data payload.

When data packet analyzer 210 detects that a data packet needs to be forwarded, it writes the data payload of the data packet into a data payload memory 230. The packet header is reconstructed later by a header generator 256. Data packet analyzer 210 stores the detected identifier of the third transceiver, as the receiver of the data packet, in information memory 250 and stores the memory address of the data payload of the data packet in data payload memory 230.

Said information memory 250 is accessed on the transmitter side by a control unit 240, which receives a signal that a new time slot has begun from a timing circuit 258. The control unit establishes, from a list of currently reserved time slots 216, whether and for which third transceiver a transmission time slot currently exists for the transceiver. If that is the case, it checks in the information memory 250 whether a data packet for the third transceiver is stored there. If that is likewise the case, control unit 240 triggers generation of a packet header containing the respective information by header generator 256. This packet header, and subsequently the unmodified data payload of the data packet, is fed to the transmitter unit 260 for transmission to the third transceiver or transceivers.

If a data packet has been detected by data packet analyzer 210 as being intended for the transceiver itself, then data packet analyzer 210 causes the data packet to be stored in a receive buffer 212, which can be accessed by a microcontroller.

The transceiver further comprises a transmit buffer 270, in which data packets generated by a module connected to the transceiver, for example by a sensor, are stored. These data packets are transmitted on a "first in, first out" basis in accordance with the time slots assigned to them.

What is claimed is:

1. A protocol accelerator module, referred to in the following as an accelerator module, for a first transceiver, said first transceiver being configured to forward a data packet from a second transceiver to one or more third transceiver according to a TDMA-based data transmission protocol, said accelerator module being configured
to query a reference table upon receiving the data packet from the second transceiver during a first time slot, said reference table containing references of at least two of the following of reference types:
a) a reference in a specific reception time slot to an identifier of at least a respective one of the one or more third transceivers, according to which a data packet received by the first transceiver during the specific reception time slot is to be forwarded to the respective one of the one or more third transceivers;
b) a reference in an identifier of a specific second transceiver, as transmitter, to an identifier of at least a respective one of the one or more third transceivers as the predetermined receiver of the data packet, referred to in the following as a virtual connection; and
c) a reference in a predetermined message contained in payload data of the data packet to an identifier of at least a respective one of the one or more the third transceiver as the predetermined receiver of the data packet; and if one of said a references of at least two reference types contained in said reference table corresponds to the data packet to detect in the reference table an identifier of the respective at least one third transceiver as the receiver of the data packet; and
during a second time slot immediately following the first time slot to cause the data packet to be sent to the respective at least one third transceiver if the second time slot has been assigned to said first transceiver.

2. The accelerator module of claim 1, configured to detect a receiver identifier, contained in the received data packet, of at least the third transceiver when the data packet from the second transceiver is received during the first time slot, and to cause the data packet to be sent to the third transceiver during the second time slot if no matching reference type for the data packet is present in the reference table and the second time slot has been assigned to said first transceiver.

3. The accelerator module of claim 1, said accelerator module being implemented in hardware comprising
a data packet analyzer on the receiver side, configured to write payload data of the received data packet into a data payload memory of the accelerator module and
to write into an information memory the detected identifier of the third transceiver as the receiver of the data packet, and a memory address of the stored data payload;
and further comprising a control unit on the transmitter side, configured to
receive time slot information about a time slot assigned to the first transceiver;
detect a receiver identifier of a third transceiver contained in the time slot information and to compare said identifier with detected receiver identifiers in the information memory;
when the receiver identifier contained in the time slot information matches a receiver identifier in the information memory, to fetch the data payload stored in the data payload memory and associated with the matching receiver identifier on the basis of a memory address assigned to the matching receiver identifier and to trigger the generation of a packet header to be added to the fetched data payload; and
to provide the fetched data payload and the generated packet header to a transmitter unit of the first transceiver as a data packet to be forwarded, for transmission in the assigned time slot.

4. The accelerator module of claim 1, in which a respective level of priority is assigned to a respective reference type and the accelerator module is configured to cause the data packet corresponding to the reference type of highest priority to be sent to the third transceiver when a plurality of references of different reference types matching the received data packet are simultaneously present.

5. The accelerator module of claim 1, which is configured to
assign a respective maximum retention time to specific virtual connections in the reference table; and
to transmit received data packets which are to be forwarded according to a specific virtual connection, with prioritization according to a respective remaining retention time.

6. The accelerator module of claim 1, configured to perform tasks of a data transmission protocol according to the IEEE 802.15.4 standard in a transceiver.

7. A first transceiver comprising; a protocol accelerator module, referred to in the following as an accelerator module, wherein said first transceiver is configured to forward a data packet from a second transceiver to one or more third transceivers according to a TDMA-based data transmission protocol, and wherein said accelerator module is configured
to query a reference table upon receiving the data packet from the second transceiver during a first time slot, said reference table containing reference of at least two of the following reference types:
a) a reference in a specific reception time slot to an identifier of at least a respective one of the one or more third transceivers, according to which a data packet received by the first transceiver during the specific reception time slot is to be forwarded to the respective one or more third transceivers;
b) a reference in an identifier of a specific second transceiver, as transmitter, to an identifier of at least a respective one of the one or more third transceivers as the predetermined receiver of the data packet, referred to in the following as a virtual connection; and
c) a reference in a predetermined message contained in payload data of the data packet to an identifier of at least a respective one of the third transceiver as the predetermined receiver of the data packet; and if one of said references of the at least two reference types contained in said reference table corresponds to the data packet, to detect in the reference table an identifier of the respective at least one third transceiver as the receiver of the data packet; and during a second time slot immediately following the first time slot to cause the data packet to be sent to the respective at least one third transceiver if the second time slot has been assigned to said first transceiver.

8. The first transceiver of claim 7, wherein said first transceiver is configured to write a data packet destined for the first transceiver into a buffer on a receiver side of the first transceiver;

to manage a queue of data packets to be sent in a buffer on a transmitter side of the first transceiver; and to select data packets from the queue during a time slot assigned to the first transceiver and to cause said data packets to be sent at least the third transceiver.

9. Sensor nodes comprising a sensor, and connected thereto the first transceiver of claim 7.

10. A method of operating a first transceiver, comprising:

forwarding of a data packet from a second transceiver to one or more third transceivers according to a TDMA-based data transmission protocol, said forwarding comprising the following steps:

receiving the data packet from the second transceiver during a first time slot;

querying a reference table, said reference table containing references of at least two of the following reference types:

a) a reference in a specific reception time slot to an identifier of at least a respective one of the one or more third transceivers, according to which a data packet received by the first transceiver during the specific reception time slot is to be forwarded to the third transceiver;

b) a reference in an identifier of a specific second transceiver, as transmitter, to an identifier of at least a respective one of the one or more third transceivers as the predetermined receiver of the data packet, referred to in the following as a virtual connection; and c) a reference in a predetermined message contained in payload data of the data packet to an identifier of at least a respective one of the one or more third transceivers as the predetermined receiver of the data packet;

detecting in the reference table an identifier of the third transceiver as the receiver of the data packet, if a matching reference for the data packet is present, or detecting an identifier of a respective one or more third transceivers in the data payload of the received data packet, if no reference matching the data packet is present; and sending the data packet to the respective one of the one or more third transceivers during a second time slot immediately following the first time slot, if the second time slot has been assigned to the first transceiver.

11. The method according to claim 10, configured to perform tasks of a data backup protocol level according to the IEEE 802.15.4 standard in a transceiver.

* * * * *

UNITED STATES PATENT AND TRADEMARK OFFICE
CERTIFICATE OF CORRECTION

PATENT NO. : 8,654,764 B2
APPLICATION NO. : 12/737274
DATED : February 18, 2014
INVENTOR(S) : Daniel Dietterle et al.

It is certified that error appears in the above-identified patent and that said Letters Patent is hereby corrected as shown below:

In the Claims:

In column 10 at line 49 (claim 7, line 9), "reference" should be --references--. (second occurrence)

In column 11 at line 17 (claim 9, line 1), "Sensor nodes" should be --A sensor node--.

Signed and Sealed this
Fifth Day of August, 2014

Michelle K. Lee
*Deputy Director of the United States Patent and Trademark Office*